S. T. WHITE.
MECHANICAL MOVEMENT.
APPLICATION FILED SEPT. 30, 1916.

1,263,498.

Patented Apr. 23, 1918.
4 SHEETS—SHEET 3.

Witnesses:

Inventor:
Samuel T. White

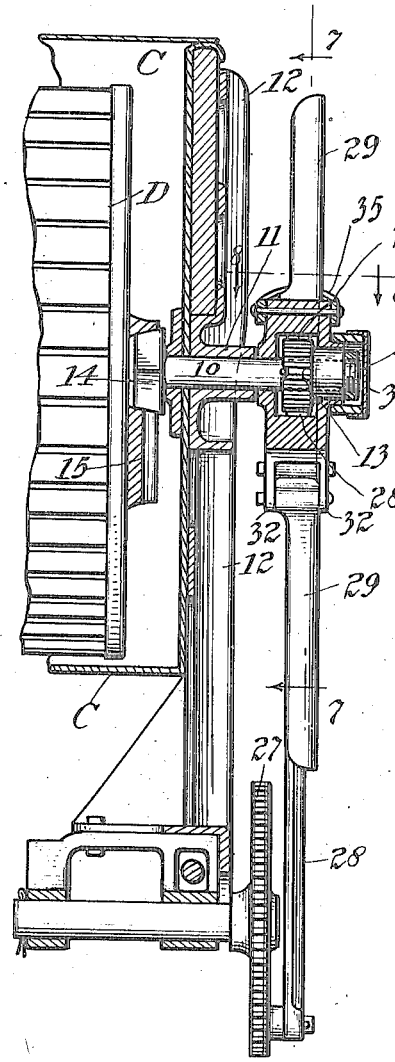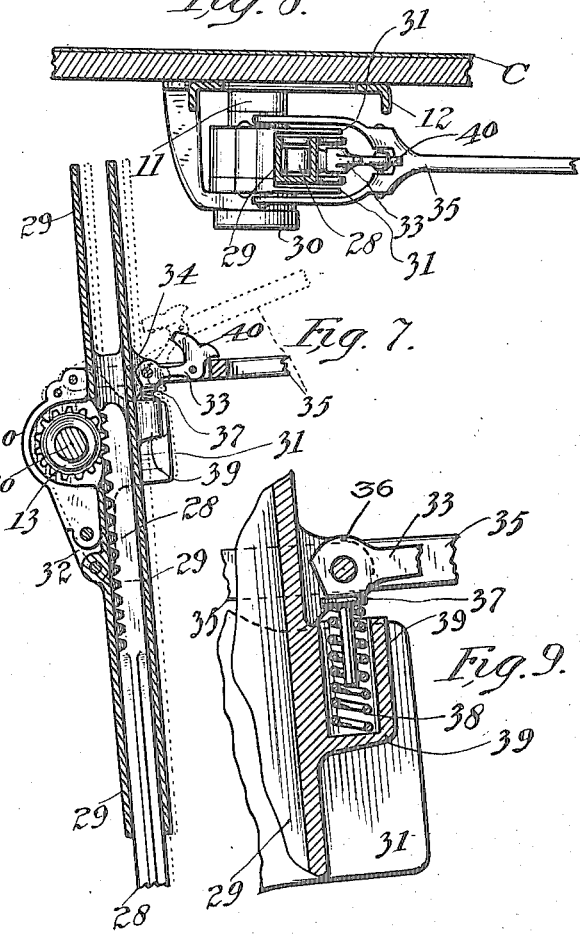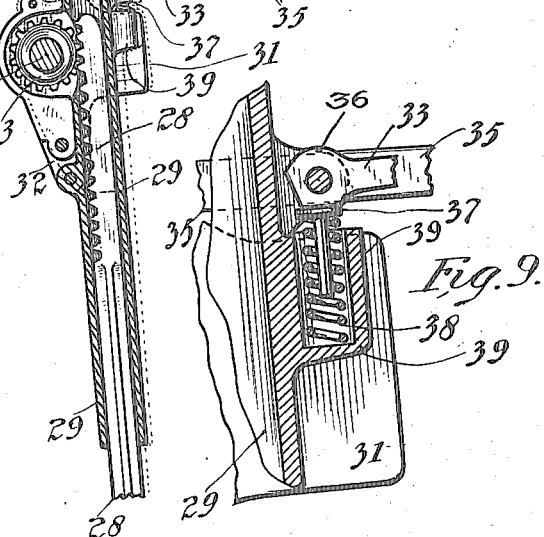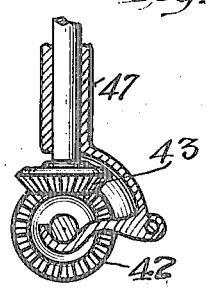

UNITED STATES PATENT OFFICE.

SAMUEL T. WHITE, OF DAVENPORT, IOWA.

MECHANICAL MOVEMENT.

1,263,498.  Specification of Letters Patent.  Patented Apr. 23, 1918.

Application filed September 30, 1916. Serial No. 122,973.

*To all whom it may concern:*

Be it known that I, SAMUEL T. WHITE, a citizen of the United States, residing at Davenport, in the county of Scott and State of Iowa, have invented new and useful Improvements in Mechanical Movements, of which the following is a full, clear, and exact description.

My invention relates to mechanical movements, and particularly to mechanical movements used in connection with washing machines of the type in which the wash is inclosed within a cylindrical container revoluble within a receptacle containing the cleansing liquid.

The object of my invention is to provide suitable mechanism for imparting a rotary reciprocable movement to said cylindrical container, and novel and simple means to enable the same to be thrown into and out of gear with the shaft that imparts motion to the said container, and also to provide means for guarding said mechanism and protecting the operator from injury therefrom. Other objects and advantages of my improved mechanism will be disclosed in the accompanying description and explanation.

In order to enable others skilled in the art to which my invention pertains to make and use the same, reference is had to the following description, and to the means particularly pointed out in the claims.

In the drawings:

Fig. 5 is a vertical longitudinal section of one end of said machine taken on dotted line 5—5, Fig. 2.

Fig. 6 is a fragmental view taken on dotted line 6—6, Fig. 2.

Fig. 7 is a transverse section of the upper broken away portion of the means employed to rotate the container shaft, taken on dotted line 7—7, Fig. 5.

Fig. 8 is a transverse section taken on dotted line 8—8, Fig. 5.

Fig. 9 is a detail view of the locking devices for keeping the shifting lever at the extremes of its movement, drawn to an enlarged scale.

Figure 1:
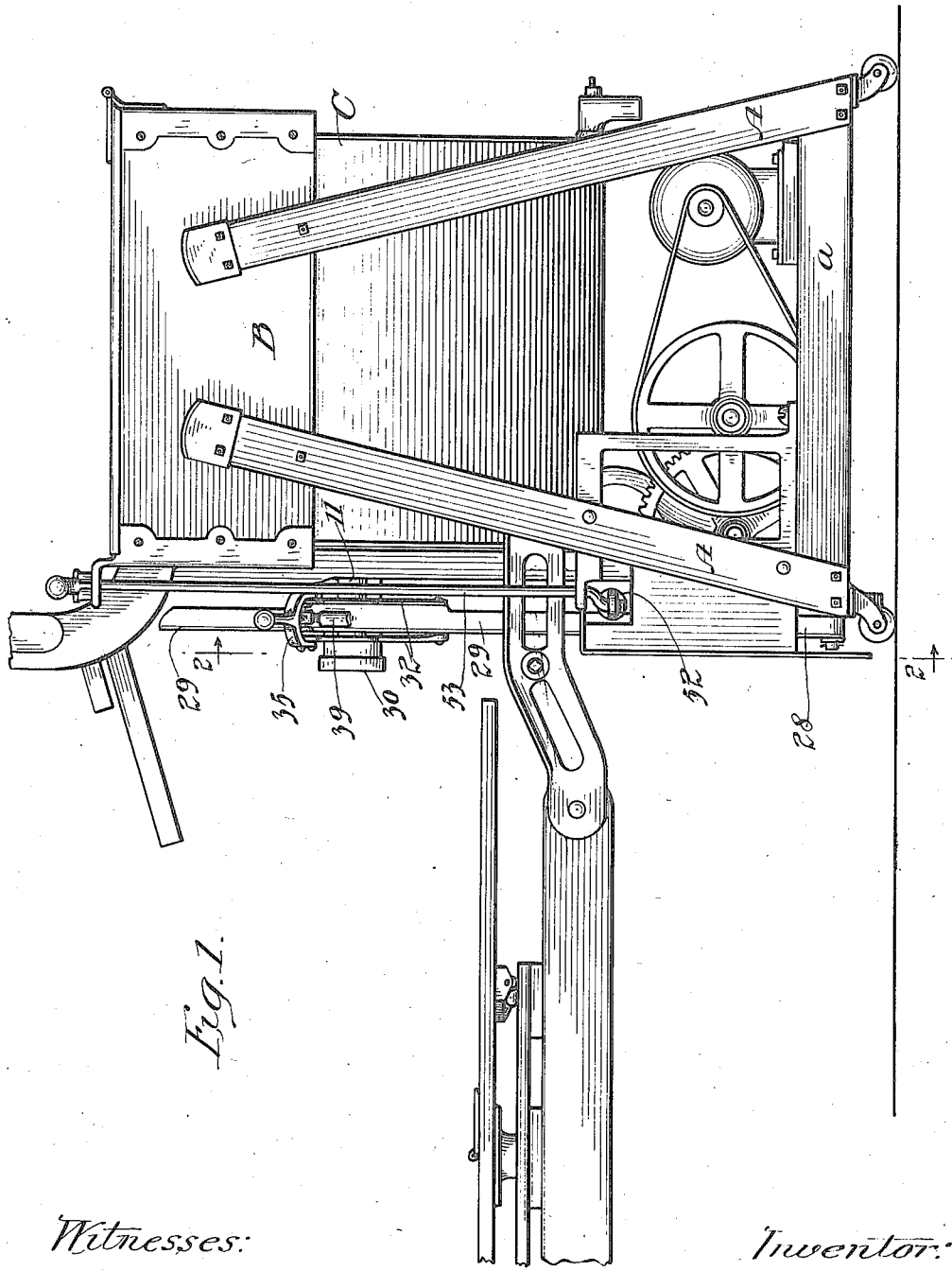
Figure 1 is a side elevation of my improved washing machine.
Figure 2:
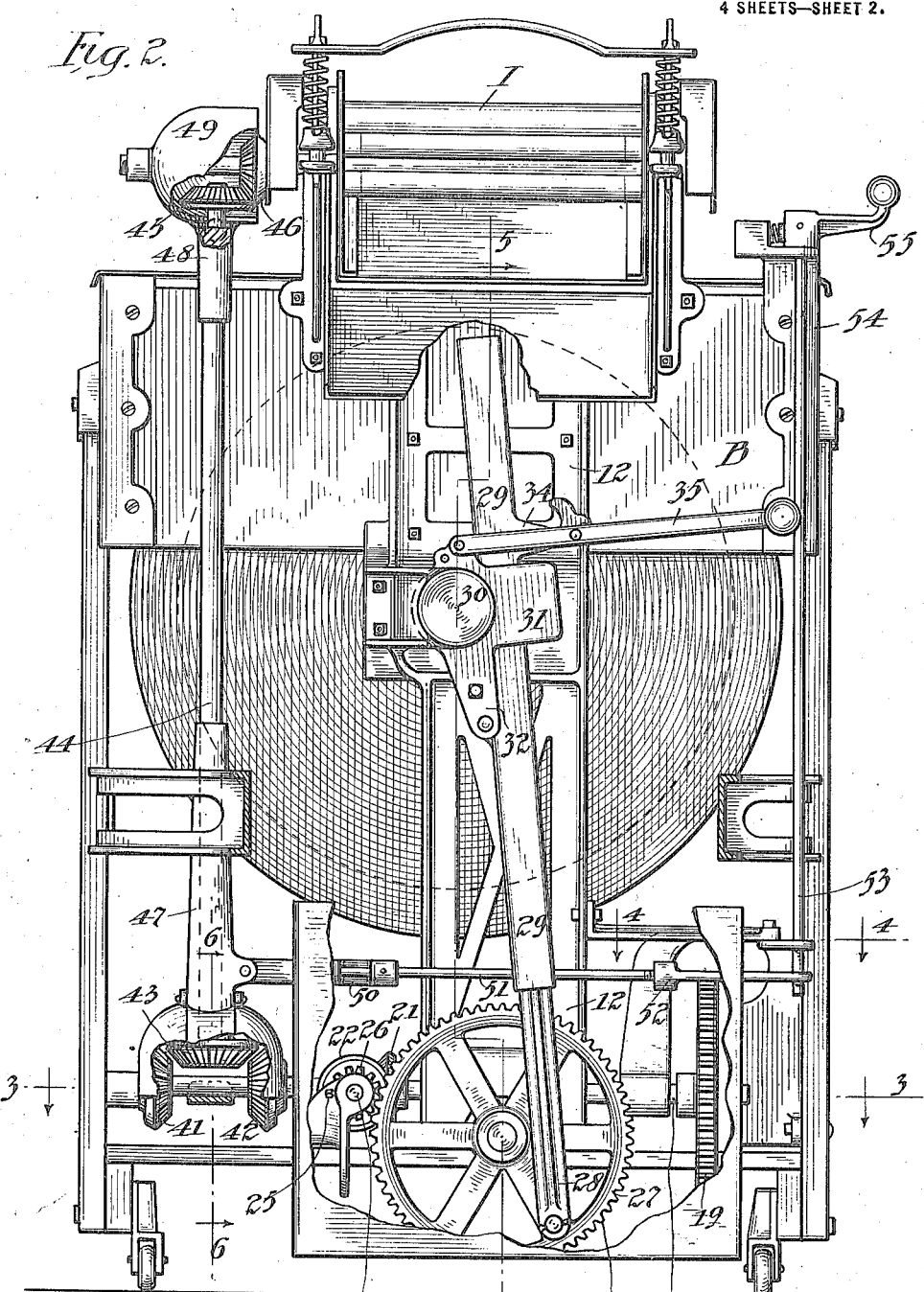
Fig. 2 is a front elevation thereof, with certain portions in front of dotted line 2—2, Fig. 1, broken away.
Figure 3:
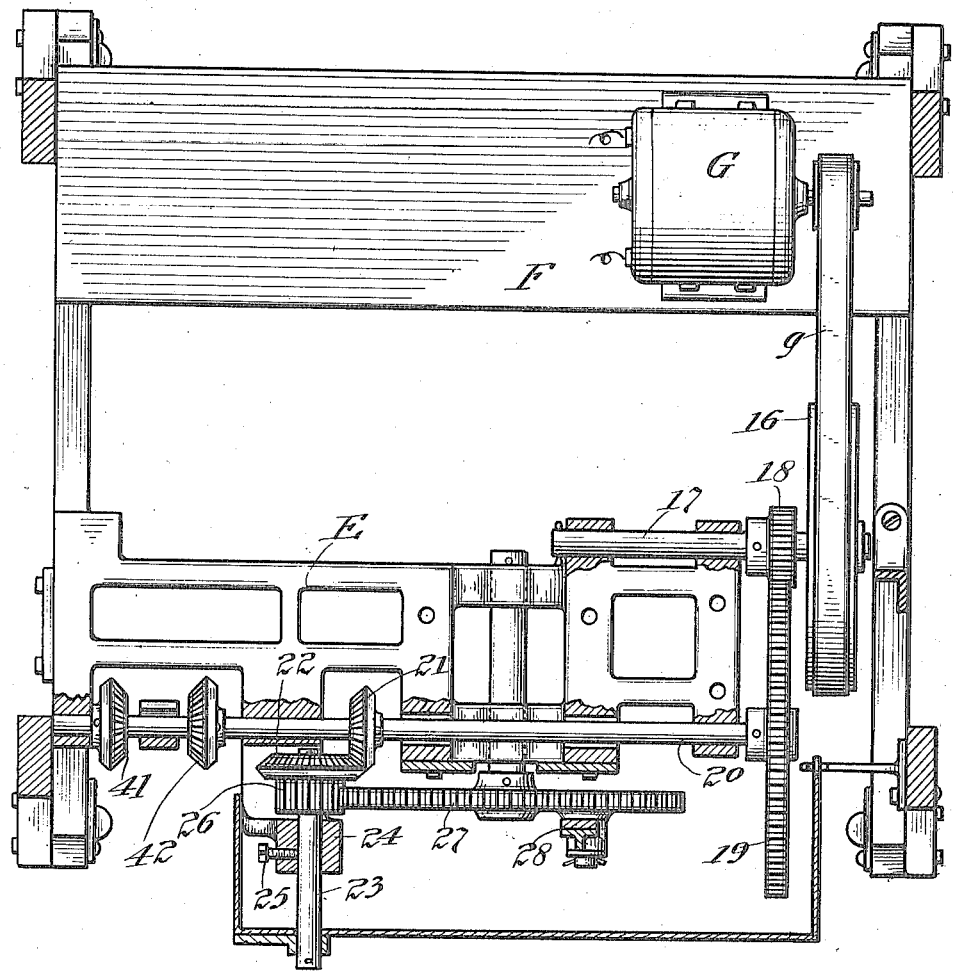
Fig. 3 is a horizontal section taken on dotted line 3—3, Fig. 2.
Figure 4:
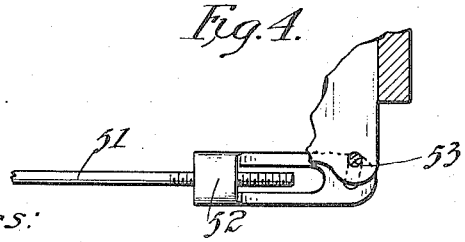
Fig. 4 is a horizontal section of a fragment of my invention taken on dotted line 4—4, Fig. 2, looking in the direction indicated by the arrows.

Reference being had to the drawings, A represents the frame-work consisting of four legs, that are connected at their lower ends on each side by a longitudinal rail $a$ and have their upper ends enter metal sockets secured to the sides of a rectangular frame B within which the upper portion of a sheet metal receptacle or tub C is secured. The lower portion or bottom of this receptacle C is made round, although any other shape may be resorted to, and at the center from which the curvature of this bottom is struck the ends of the receptacle are provided with suitable bearings on the inside of the front and rear ends for the reception of the journaling elements of a cylindrical container or cylinder D. This cylinder is usually made of wood, and the heads thereof are solid and are connected by a series of equi-distant slats that permit the water and suds to enter and circulate through the cylinder as it revolves in receptacle C. The bearing element for the front end of cylinder D comprises a short shaft 10 that is journaled in the bearings secured to the inside of the front end of receptacle C and extends out through suitable bearings 11 made integral with a cross-bar of a vertical metal frame-work 12, which latter is secured about midway between legs to the outer surface of the front member of rectangular frame B of the receptacle or tub and depends nearly to the floor where, at its lower end, it is connected to and assists in supporting a metal cross-frame E. The outer end of this short shaft 10 has a pinion 13 secured thereto and its inner end is provided with a rectangular head 14 that enters a suitable axial recess in a plate 15 secured to the adjacent head of cylinder D.

The rear portions of rails $a$, $a$, of the supporting frame are connected by a platform F, and at one end of this platform a suitable motor G, which, through the medium of a belt *g* and pulley 16, drives a transverse shaft 17 that is journaled in suitable bearings in the adjacent end of cross-frame E. Shaft 17 has a pinion 18 mounted thereon which meshes with and drives a large gear 19 securely mounted on the adjacent end of a transverse shaft 20 which is journaled in suitable bearings in cross-frame E and extends from gear 19 to the opposite end of said cross-frame. At a suitable point between its ends a beveled pinion 21 is securely mounted on shaft 20 that engages a beveled gear 22 loosely mounted on a stationary shaft 23, which latter is secured by means of a set screw 25 in a boss 24 arising from the forward end of a forwardly extending branch of cross-frame E. Beveled gear 22 has an integral pinion 26 extending axially from its front side, and this pinion 26 engages and drives a large gear 27.

Gear 27 has a suitable wrist-pin projecting forward from one of its arms, and the lower end of an oscillating rack 28 is pivotally mounted on this wrist-pin. This rack extends upward and only the upper portion thereof is provided with teeth that engage pinion 13. The upper portion of this rack enters and has reciprocable play in a tubular casing 29 that holds it in or out of engagement with said pinion 13. A guard 30 is provided for pinion 13 a part of which surrounds the portion of the periphery of said pinion opposite where it is engaged by the rack and has openings in its sides to permit it to be pivotally mounted on shaft 10 and the outwardly extending boss of pinion 13 on the other side. The sides of this guard have laterally projecting wings 31 between which casing 29, (which incloses rack 28) extends, and also have downwardly extending lugs 32, 32, the lower ends of which are pivotally connected to said casing 29 and support the same. The bifurcated ends of a laterally extending lever 35 pass on either side of casing 29 and are fulcrumed to guard 30 above pinion 13, and said lever is also connected by a short link 33 to casing 29, which link is pivoted in the crotch of said bifurcations at one end and between lugs 34 projecting from casing 29 at the other end. The end of link 33 between lugs 34 is provided with an enlarged head 36, and the edge of the latter is provided with two flattened surfaces, as shown, that are adapted to be engaged by the flattened head of a bolt-shaped pressure-foot 37 whose shank extends down into and is surrounded by a coil-spring 38 that is seated in a suitable cup-shaped socket 39 made integral with casing 29.

When lever 35 is in its horizontal position link 33 will push casing 29 toward shaft 10 and cause the teeth of rack 28 to engage with pinion 13, but when said lever 35 is raised to a substantially vertical position link 33 will draw said casing away from shaft 10 and cause the rack to be disengaged from pinion 13, substantially as shown in dotted lines in Fig. 7.

The end of link 33 that is pivoted in the crotch of lever 35 is provided with an upwardly projecting lug 40 which is provided with two branches, one of which projects toward the handle of lever 35. The branches of this lug 40 limit the movement of said lever from a horizontal position to a substantially vertical position by engaging the upper surface of the crotch of the lever when the latter is in a horizontal position and by engaging the adjacent side of the casing when the lever is in its substantially vertical position. The pressure of pressure-foot 37 against the flattened edges of head 36 of the link assists in retaining said lever either in its horizontal or substantially vertical position.

Shaft 20 is provided near the end thereof opposite gear 19 with beveled gears 41 and 42 that face each other, and one or the other of these gears is adapted to be engaged by an intermediate bevel-gear 43 that is secured on the lower end of a vertical shaft 44, which latter extends upward to a point above the top of receptacle C, and has a miter-gear 45 on its upper end that meshes with a similar miter-gear 46 on the adjacent end of a shaft of one of the rollers of a wringer I. Shaft 44 is journaled at its lower end in a vibratory sleeve 47 and its upper end is journaled in the sleeve 48 of a suitable casing 49 mounted upon the extended end of the same roller-shaft upon which miter-gear 46 is securely mounted. When sleeve 47 is moved laterally in one direction, gear 43 will engage, say, beveled gear 41 and shaft 44 will be revolved in one direction, and when said sleeve is moved laterally in the other direction gear 43 will engage gear 42 and shaft 44 will be revolved in the opposite direction.

I accomplish the movements of shaft 44 by means of a connecting-rod consisting of a link member 50, a rod 51 and a turn-buckle 52. The link-member of said connecting rod is pivoted at one end to a lug projecting from sleeve 47 and has rod 51 adjustably secured in its opposite end. The opposite end of rod 51 is screw-threaded and tapped into an enlarged boss on the adjacent end of turn-buckle 52. The end of turn-buckle 52 opposite that engaged by rod 51 is pivotally secured to the lower laterally bent arm of a vertical rock-shaft 53. This rock-shaft extends above receptacle C and has its upper end journaled in a casting 54 that binds and protects the corners of the rectangular frame-work B, and above its bearings it has a crank 55 secured thereto by grasping which said shaft 53 can be rotated in either direction to move the transverse connecting-rod and oscillate sleeve 47 and the lower end of shaft 44.

It is unnecessary to explain the details of construction of wringer I and the miter-gear mechanism for operating the same. It will be understood that in mechanism of the kind to which my invention relates, many details of construction may be changed without departing from the spirit of the invention, which, principally, relates to the novel method of reciprocating the cylinder in receptacle B, and in throwing the rack into and out of engagement with pinion 13 on the shaft through the medium of which motion is imparted from the rack and pinion 13 to the cylinder within receptacle C.

What I claim as new is:

1. Mechanism of the kind specified comprising a horizontal shaft, a pinion on said shaft, a vertically disposed rack engaging said pinion, a gear to which the lower end of said rack is pivotally connected whose axis is parallel to that of said shaft, a member adjacent said pinion that is loosely mounted on said pinion, and a casing within which said rack has reciprocable movement and which is pivoted to said member below said shaft.

2. Mechanism of the kind specified comprising a horizontal shaft, a pinion on said shaft, a vertically disposed rack engaging said pinion, a gear to which the lower end of said rack is pivotally connected whose axis is parallel to that of said shaft, a guard enveloping the pinion except where it is engaged by said rack said guard having its sides loosely mounted on said pinion, and a casing within which said rack has reciprocable movement and which is pivoted to said guard below said shaft.

3. Mechanism of the kind specified comprising a horizontal rock-shaft, a pinion on said shaft, a vertically disposed rack engaging said pinion, a gear whose axis is parallel to that of said shaft and to which the lower end of said rack is pivotally connected, a guard enveloping the pinion except where it is engaged by said rack, a casing for said rack which is pivotally connected to said guard below said pinion, and means for moving said casing toward and from said pinion.

4. Mechanism of the kind specified comprising a horizontal rock-shaft, a pinion on said shaft, a vertically disposed rack engaging said pinion, a gear whose axis is parallel to that of said shaft and to which the lower end of said rack is pivotally connected, a guard enveloping the pinion except where it is engaged by said rack, a casing for said rack which is pivotally connected to said guard below said pinion, and a lever for moving said casing toward and from said pinion.

5. Mechanism of the kind specified comprising a horizontal rock-shaft, a pinion on said shaft, a vertically disposed rack engaging said pinion, a gear whose axis is parallel to that of said shaft and to which the lower end of said rack is pivotally connected, a guard enveloping the pinion except where it is engaged by said rack, a casing for said rack which is pivotally connected to said guard below said pinion, a lever for moving said casing toward and from said pinion, and means for retaining said lever at the limits of its movement.

6. Mechanism of the kind specified comprising a horizontal rock-shaft, a pinion on said shaft, a vertically disposed rack engaging said pinion, a gear whose axis is parallel to that of said shaft and to which the lower end of said rack is pivotally connected, a guard enveloping the pinion except where it is engaged by said rack, a casing for said rack which is pivotally connected to said guard below said pinion, a lever for moving said casing toward and from said pinion, and means for retaining said lever at the limits of its movement including a link connecting said lever and casing.

7. Mechanism of the kind specified comprising a horizontal rock-shaft, a pinion on said shaft, a vertically disposed rack engaging said pinion, a gear whose axis is parallel to that of said shaft and to which the lower end of said rack is pivotally connected, a guard enveloping the pinion except where it is engaged by said rack, a casing for said rack which is pivotally connected to said guard below said pinion, a lever for moving said casing toward and from said pinion, and means for retaining said lever at the limits of its movement including a link connecting said lever and casing, the end of which connected to said lever has a divided lug projecting therefrom, and a spring controlled pressure member engaging the end thereof connected to said casing.

8. Mechanism of the kind specified comprising a horizontal rock-shaft, a pinion on said shaft, a vertically disposed rack engaging said pinion, a gear whose axis is parallel to that of said shaft and to which the lower end of said rack is pivotally connected, a guard enveloping said pinion except where it is engaged by the rack, said guard having lateral wings, a casing for said rack extending up between said wings and pivotally supported below said pinion, a lever the bifurcated ends of which are pivoted to said guard, and a link connecting the crotch of said bifurcations to said casing.

9. Mechanism of the kind specified comprising a horizontal rock-shaft, a pinion on said shaft, a vertically disposed rack engaging said pinion, a gear whose axis is parallel to that of said shaft and to which the lower end of said rack is pivotally connected, a guard enveloping said pinion except where it is engaged by the rack, said guard having lateral wings and a downward extension, a casing for said rack extending up between said wings and pivoted to said extension below said pinion, a lever the bifurcated ends of which are pivoted to said guard, and a link connecting the crotch of said bifurcations to said casing.

In witness whereof I have hereunto set my hand this 16th day of September, 1916.

SAMUEL T. WHITE.

Witnesses:
 HENRY F. EMME,
 F. L. MAXFIELD.